(12) United States Patent
Chandrasekhar et al.

(10) Patent No.: US 12,515,194 B2
(45) Date of Patent: *Jan. 6, 2026

(54) GRAPHENE BASED ADSORBENT MATERIAL FOR EVAP CANISTER USED IN A VEHICLE EMISSIONS MANAGEMENT SYSTEM

(71) Applicant: Martinrea International US Inc., Auburn Hills, MI (US)

(72) Inventors: Murali Chandrasekhar, Rochester, MI (US); Pragathi Darapaneni, Auburn Hills, MI (US); Anindya Banerji, Windsor (CA); Cory Doble, Ortonville, MI (US)

(73) Assignee: Martinrea International US Inc., Auburn Hills, MI (US)

( * ) Notice: Subject to any disclaimer, the term of this patent is extended or adjusted under 35 U.S.C. 154(b) by 653 days.

This patent is subject to a terminal disclaimer.

(21) Appl. No.: 17/975,102

(22) Filed: Oct. 27, 2022

(65) Prior Publication Data

US 2023/0133755 A1     May 4, 2023

Related U.S. Application Data

(60) Provisional application No. 63/274,158, filed on Nov. 1, 2021.

(51) Int. Cl.
    *B01D 53/04*     (2006.01)
    *B01J 20/20*     (2006.01)
    (Continued)

(52) U.S. Cl.
    CPC .............. *B01J 20/20* (2013.01); *B01D 53/04* (2013.01); *B01J 20/24* (2013.01);
    (Continued)

(58) Field of Classification Search
    CPC ...... B01J 20/20; B01J 20/24; B01J 20/28016; B01J 20/28045; B01J 20/3085;
    (Continued)

(56) References Cited

U.S. PATENT DOCUMENTS

| | | |
|---|---|---|
| 5,599,384 A | 2/1997 | Yoshida et al. |
| 7,467,620 B1 | 12/2008 | Reddy |

(Continued)

FOREIGN PATENT DOCUMENTS

| | | |
|---|---|---|
| GB | 2 569 353 A | 6/2019 |
| WO | 2011/053695 A1 | 5/2011 |

(Continued)

OTHER PUBLICATIONS

International Search Report for Appln. No. PCT/US2022/078905, mailed Feb. 2, 2023, 19 pages.

(Continued)

*Primary Examiner* — Frank M Lawrence, Jr.
(74) *Attorney, Agent, or Firm* — Dinsmore & Shohl LLP (57) ABSTRACT

An evaporative emissions control system for an automobile for reducing evaporative emissions, having an evaporative canister coupled to a fuel tank, the canister containing sorbent material capable of adsorbing hydrocarbons and selected from the group of activated Graphene-derivatives not limited to any of monolayer Graphene, few layered Graphene, Graphene oxide, reduced Graphene oxide, and functionalized Graphene. A vapor inlet on the canister is connected to the fuel tank, a purge outlet on the canister being connected to an air induction system, wherein the sorbent material adsorbs fuel vapors when the engine is not running and desorbs fuel vapors when the engine is running.

20 Claims, 5 Drawing Sheets

(51) Int. Cl.
  *B01J 20/24* (2006.01)
  *B01J 20/28* (2006.01)
  *B01J 20/30* (2006.01)
  *F02M 25/08* (2006.01)

(52) U.S. Cl.
  CPC ... *B01J 20/28016* (2013.01); *B01J 20/28045* (2013.01); *B01J 20/3085* (2013.01); *F02M 25/0854* (2013.01); *B01D 2257/702* (2013.01); *B01D 2259/4516* (2013.01)

(58) Field of Classification Search
  CPC .. F02M 25/0854; F02M 25/089; B01D 53/04; B01D 2253/102; B01D 2257/702; B01D 2259/4516
  USPC ......... 96/108, 121, 132, 134, 135, 137, 147, 96/153, 154; 95/146; 123/518, 519
  See application file for complete search history.

(56) References Cited

U.S. PATENT DOCUMENTS

| | | | |
|---|---|---|---|
| 10,006,413 | B2 | 6/2018 | Dudar et al. |
| 11,203,721 | B1* | 12/2021 | Zoican-Loebick ......................... B01J 20/3202 |
| 2007/0012298 | A1 | 1/2007 | Hiroshi et al. |
| 2008/0302341 | A1 | 12/2008 | Reddy |
| 2020/0038798 | A1* | 2/2020 | Greenbank ........ B01D 53/0407 |
| 2021/0140096 | A1 | 5/2021 | Zhang |
| 2023/0134553 | A1* | 5/2023 | Chandrasekhar ...... B01J 20/261 96/147 |

FOREIGN PATENT DOCUMENTS

| | | |
|---|---|---|
| WO | 2019/003157 A1 | 1/2019 |
| WO | 2020/015591 A1 | 1/2020 |

OTHER PUBLICATIONS

Barbara Szczesniak, Jerzy Choma, Mietek Jaroniec "Effect of graphene oxide on the adsorption properties of ordered mesoporous carbons toward H2, C6H6, CH4and CO2", Microporous and Mesoporous Materials, Elsevier, Amsterdam ,NL, vol. 261, Nov. 8, 2017 (Nov. 8, 2017), pp. 105-110, XP085354292, ISSN: 1387-1811, DOI: 10.1016/J.MICROMESO.2017.10.054 y.

Micromeritics: "ASAP 2020—Accelerated Surface Area and Porosimetry System", Jul. 22, 2013 (Jul. 22, 2013), XP055453543, Retrieved from the Internet: URL:https://web.archive.org/web/20130722053832if_/http://www.micromeritics.com:80/Repository/Files ASAP_2020_Brochure_3.pdf [retrieved on Feb. 22, 2018] see, in particular, figure at right col. of p. 2; entire point "Intelligent Design" and entire point "ASAP 2020 Features" at p. 2; see also figures at p. 5 and entire point "Designed for Expanding Needs" at p. 5.

Sivapragasam Nilushni, Mindika T. Nayakasinghe; Uwe Burghaus : "Adsorption of n-butane on graphene/Ru(0001)—A molecular beam scattering study", Journal of Vacuum Science, vol. 34, No. 4, Jul. 1, 2016 (Jul. 1, 2016), p. 041404, XP093015199, 2 Huntington Quadrangle, Melville, NY 11747 ISSN: 0734-2101, DOI: 10.1116/1.4954811 see, in particular, entire points A "experimental setup" B "Graphene synthesis and characterisation" and B "Adsorption dynamics" as well as figures 2,4 and table 1.

Mohammed Yosef, Alaa Fahmy, Walid El Hotaby, Ali M. Hassan, Ahmed S.G. Khalil, Badawi Anis: "High performance graphene-based PVF foam for lead removal from water", Journal of Materials Research and Technology, vol. 9, No. 5, Sep. 1, 2020 (Sep. 1, 2020-09), pp. 11861-11875, XP093015203, BR ISSN: 2238-7854, DOI: 10.1016/j.jmrt.2020.08.011 see, in particular, entire point 2.3 "Preparation of GO/PVF foams" and figure 1. See also figures 4 and 6.

Barbara Szczesniak, Jerzy Choma, Mietek Jaroniec: "Gas adsorption properties of graphene-based materials", Advances in Colloid and Interface Science, Elsevier, NL, vol. 243, Mar. 20, 2017 (Mar. 20, 2017), pp. 46-59, XP029990387, ISSN: 0001-8686, DOI : 10.1016/J.CIS.2017.03.007 see, in particular, table 3 (CH4 adsorption on graphene materials).

Joseph C. Schaeperkoetter, Matthew .J Connolly, Zachary N .Buck, Haskell Taub, Helmut Kaiser, Carlos Wexler : "Adsorption-Induced Expansion of Graphene Oxide Frameworks : Observation by in Situ Neutron Diffraction", ACS Omega, vol. 4, No. 20, Oct. 28, 2019 (Oct. 28, 2019), pp. 18668-18676, XP093014800, us ISSN: 2470-1343, DOI: 10.1021/acsomega . 9b02589 Retrieved from the Internet: URL:http://pubs.acs.org/doi pdf/10.1021/ac somega.9b02589> see, in particular, figures 6-8 and 14.

Lijuan Jia, Weihua Yu, Chao Long, Aimin Li: "Adsorption equilibrium and dynamics of gasoline vapors onto polymeric adsorbents", Environmental Science and Pollution Research, vol. 21, No. 5, Nov. 27, 2013 (Nov. 27, 2013), pp. 3756-3763, XP093014819, Berl.in/ Heidel.berg ISSN: 0944-1344, DOI: 10.1007sll356-013-2328-z Retrieved from the Internet: URL:http : //l.ink.springer.com/articl. e/10.10 07/s11356-013-2328-z/ful.l.text.html.> see,in particular, table 2.

Srinivas Gadipelli, Zheng Xiao Guo: "Graphene-based materials: Synthesis and gas sorption, storage and separation", Progress in Materials Science . vol. 69, Oct. 29, 2014 (Oct. 29, 2014), pp. 1-60, XP055298948, GB ISSN: 0079-6425, DOI: 10.1016/jpmatsci.2014. 10.004 see, in particular, figures 32, 38 and table 5.

Zhang Guang: "Harvesting environment energy from water-evaporation over free-standing graphene oxide sponges", Carbon, vol. 148, Jul. 1, 2019 (Jul. 1, 2019), pp. 1-8, XP093015218, GB ISSN: 0008-6223, DOI: 10 . 1016/j.carbon. 2019.03.041 see, in particular, figures 1-5.

Joel Gutiérrez-Martínez, Nguyen Esmeralda López-Lozano : "A Mythic Labyrinth Inside Your Vehicle Prevents Gasoline Leakage", A Frontiers/Front.iers for Young Minds, Oct. 5, 2021 (Oct. 5, 2021), pp. 1-8, XP093014815, DOI: 10.3389/frym.2021.563843 Retrieved from the Internet: URL:https : //kids.frontiersin.org/articles/ 10.3389/frym.2021.563843 [retrieved on Jan. 17, 2023] see, in particular, figures 1,2,3.

* cited by examiner

GRAPHENE BASED ADSORBENT MATERIAL FOR EVAP CANISTER USED IN A VEHICLE EMISSIONS MANAGEMENT SYSTEM

CROSS REFERENCE TO RELATED APPLICATIONS

The present application claims the priority of U.S. Ser. No. 63/274,158 filed Nov. 1, 2021.

FIELD OF THE INVENTION

The present invention relates generally to adsorbent materials incorporated into an EVAP canister. More particularly, the present invention discloses a graphene based adsorbent material utilized in an evaporative emissions management system and which can include any of activated-graphene derivatives or graphene-based foam compositions.

BACKGROUND OF THE INVENTION

The Evaporative Emission Control (EVAP) System seals the fuel system of the vehicle in order to prevent fuel vapors from the fuel tank and fuel system from escaping into the atmosphere. This is important because fuel vapors contain a variety of hydrocarbons, which form smog when they react with air and sunlight. As is known, gasoline evaporates very quickly, so if the fuel system is open to the atmosphere, a vehicle can pollute at all hours of the day (most notably diurnally) and without even being turned on. Studies have shown that these uncontrolled evaporative emissions can account for as much as 20% of the pollution produced by a vehicle.

One of the major components of a typical EVAP system is the fuel tank which stores gasoline. The operation of filling pumps is such that they will stop the gas flow once the nozzle detects an achieved fill level within the tank, this in order to retain a minimal expansion space at the top so that the fuel stored therein so that the fuel can expand without overflowing or forcing the EVAP system to leak.

A gas cap seals off the filler neck of the gas tank from the outside atmosphere. Damaged or missing gas caps are the most common cause of EVAP system failure codes which can trigger a check engine light.

The liquid-vapor separator prevents liquid gasoline from entering the EVAP canister, which would overload its ability to store fuel vapors.

An EVAP canister is connected to the fuel tank by the tank vent line and typically contains one to two pounds of an activated carbon that acts like a sponge by adsorbing and storing fuel vapors, until the purge valve opens and allows the vacuum of the engine intake to siphon the fuel vapors from the carbon into the engine intake manifold (desorption). The vent control valve allows the flow of the fuel vapors from the fuel tank into the EVAP canister.

An engine control system, dedicated towards minimizing emissions, facilitates canister purging such that, during the engine operation, the adsorbed fuel vapor is removed from the activated carbon by purging the canister system with ambient air drawn through the vent port into the canister and flowing through the adsorbent carbon bed, resulting in desorption of vaporized hydrocarbons through the purge port into the engine intake. The regenerated carbon is then ready to adsorb additional fuel vapor and the cycle continues. In this fashion, the "EVAP" canister plays a critical role in the modern Evaporative Emission Control Technology by temporarily adsorbing the vaporized hydrocarbons and letting out only clean air.

The purge valve/sensor allows the engine intake vacuum to siphon the amount of fuel vapors from the EVAP canister into the engine intake manifold (desorption process). Vent hoses provide the means by which the fuel vapors flow to different components of the EVAP system.

The fuel tank pressure sensor monitors the pressure for leaks and excess pressure. Finally, the fuel level sensor monitors the level of fuel in the tank.

An example of an existing evaporative emission control system with new adsorbents is disclosed in U.S. Pat. No. 7,467,620 to Reddy and which teaches an adsorbent such as an activated carbon having a nearly linear isotherm provided therein.

As is further noted, and in contrast to exhaust emissions, evaporative emissions have no color thereby posing risk of escaping unnoticed. If allowed to escape these vaporized hydrocarbons will react with air in presence of sunlight and generate smog that is harmful to human population and the eco-system at large.

Accordingly, the primary objective of the automotive Evaporative Emission Control Technology is to prevent volatile organic compounds (VOC's), such as vaporized hydrocarbons, from escaping into the atmosphere and meeting the EPA/CARB standard under LEV II/LEV III emission standards. The "EVAP Canister", as described above, plays a critical role in the modern Evaporative Emission Control Technology by temporarily adsorbing the vaporized hydrocarbons and letting out only clean air. The size of the canister and the volume of the adsorbent material are further typically selected to accommodate the expected fuel vapor evaporation associated with the given application.

The major sources for evaporative emissions can be traced to refueling and diurnal related emissions. During refueling, when new fuel is added to the automobile gasoline tank from the dispenser nozzle, vaporized hydrocarbons (such as butanes and pentanes) that are displaced from the gasoline tank is vented into the canister. Diurnal emissions occur due to fuel vapors generated as a result of temperature fluctuations during the day and night. The canister contains an adsorbent material such as a high surface area (activated) carbon, with the size of the canister and the volume of the adsorbent material selected to accommodate the expected fuel vapor evaporation.

The gasoline vapors, again primarily comprising of hydrocarbon molecules such as butanes and pentanes, are attracted to the non-polar surface of the activated carbon and become temporarily adsorbed (physisorption) letting out only clean air through the vent port into the atmosphere. Since the refueling process generates high concentration of hydrocarbons, advanced canisters employ multiple chambers and specially designed carbon adsorbents in an effort to achieve low or zero evaporative emissions.

As is further known, there are certain limitations to the long-term performance of the activated carbon adsorbent material utilized in conventional EVAP canisters. If the desorption process is not complete it leads to minute residue hydrocarbons on the adsorbent material and over time will reduce the adsorption capacity. As a result, during refuelling or during diurnal losses, air flow from fuel tank to the canister and out into the atmosphere through the vent port may contain trace amounts of harmful gasoline components which are not adsorbed owing to reduced adsorption capacity of the adsorbent material. Accordingly, and although traditionally activated carbon in the form of extruded pellets have been the predominant choice for canister fill, such persistent "bleed" issues remain a problem.

SUMMARY OF THE INVENTION

The present invention seeks to address the shortcomings of traditional carbon based adsorbent materials and discloses instead a graphene based adsorbent material (including any of a powder, pellet, foam, felt or other composition) utilized in an EVAP canister forming a portion of an evaporative emissions management system that is adsorptive of high concentration of vaporized hydrocarbons for reduced emissions from the canister.

The graphene-derivatives are incorporated in a polymer in the form of any of pellets or foam that is used to maintain the canister volume and enable proper adsorption of fuel vapors in the canister. Additional Graphene-derivatives are incorporated in a polymer in the form of a felt that is used to pack down the adsorbent material in the canister.

The group of Graphene-derivatives may include but is not limited to monolayer Graphene, few layered Graphene, Graphene oxide, reduced Graphene oxide, and functionalized-Graphene. The loading concentration of Graphene-derivatives for foam and felt may vary from 0.1-60 percentage by weight. The polymer may be a thermoplastic polymer and may be chosen from, but not restricted to polyurethane, polyester, polypropylene, nylon 6, nylon 6,6, nylon-12, nylon-6,12, polyethylene, terephthalate, polybutylene, polyphthalamide, polyoxymethylene, polycarbonate, and polyvinylchloride.

In another embodiment, the adsorbent material may be a combination of Graphene-derivatives and lignocellulosic material or charcoal incorporated into either of the foam or felt.

A corresponding evaporative emissions control system for an automobile for reducing evaporative emissions includes an evaporative canister coupled to a fuel tank. The canister contains a graphene adsorbent composition with a vapor inlet on the canister connected to the fuel tank and a purge outlet connected to an air induction system. In operation, the adsorbent material adsorbs fuel vapors when the engine is not running and desorbs fuel vapors when the engine is running.

Additional features again include the graphene adsorbent being provided as any of a foam, felt or as a powder such as extruded in the form of pellets. In one variant, an organic polymer binder provides for pelletization of powder adsorbent material into the form of pellets. The binder can further be cellulose based.

Other features include the graphene adsorbent composition being produced through extrusion and cryodesiccation processes in order to maintain high surface area and optimal pore sizes for providing appropriate adsorption and desorption of vaporized hydrocarbons.

BRIEF DESCRIPTION OF THE DRAWINGS

Reference will now be had to the attached illustrations, when read in combination with the following detailed description, wherein like reference numerals refer to like parts throughout the several views, and in which.

DETAILED DESCRIPTION OF THE PREFERRED EMBODIMENTS

With reference to the attached illustrations, the present invention seeks to address the shortcomings of traditional carbon based adsorbent materials and discloses instead a graphene based adsorbent material utilized in an EVAP canister forming a portion of an evaporative emissions management system.

Figure 1:
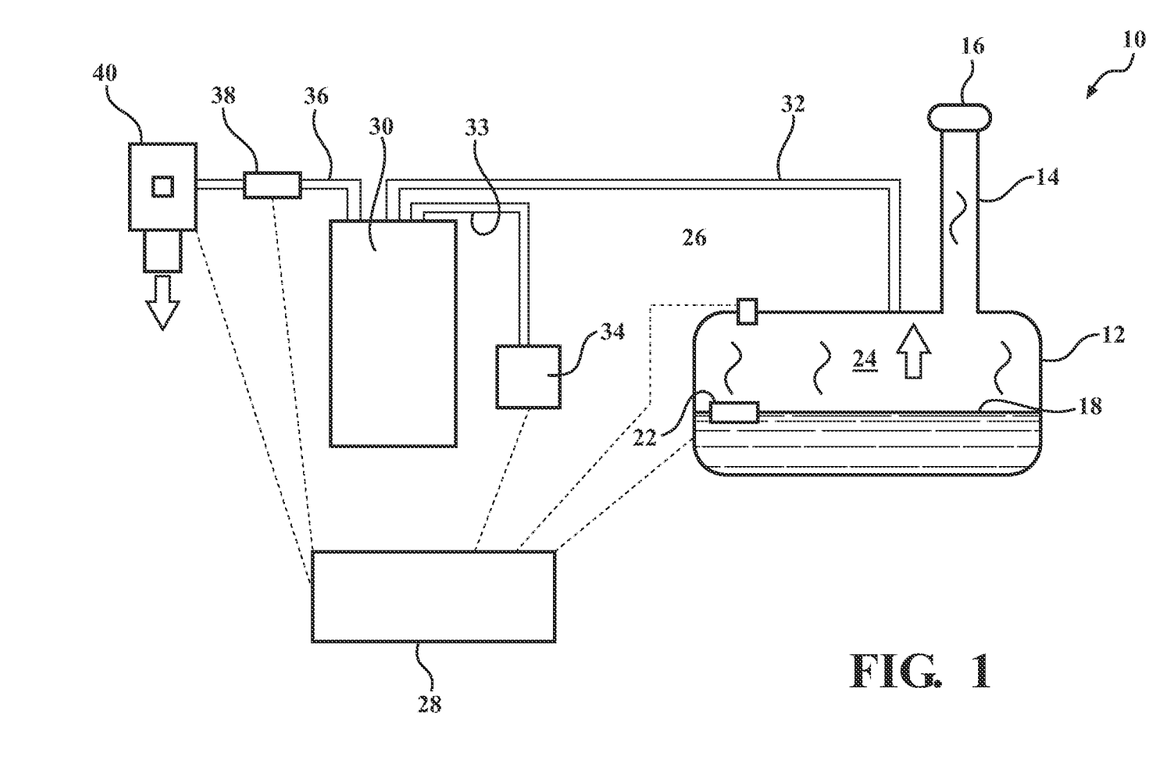
FIG. 1 is a schematic of an overall evaporative emission control system utilizing a graphene based adsorbent material within an EVAP vapor canister according to one application of the present invention.

FIG. 1 is a schematic of an evaporative emission control system, generally referenced 10, utilizing the new sorbent material of the present invention which is capable of adsorbing hydrocarbons. The system includes a fuel tank 12 with an extending fill neck 14 and a sealed fuel cap 16. The gas tank is shown in cutaway and depicts liquid gasoline defining a fill level 18 which is read by a fuel level sensor 22. Above the fill level, an unoccupied upper expansion space or volume of the tank is occupied by fuel vapors 24 (e.g. pentanes, butanes, etc.). A fuel tank pressure sensor 26 is also located in the tank 12 and, in combination with the fuel level sensor 22, supplies fill level and tank pressure readings to a suitable Powertrain Control Module (PCM) 28.

An EVAP vapor canister 30 is provided and is communicated by a vapor inlet line 32 extending from the fuel tank 12, this communicating with a vent control valve for allowing the flow of fuel vapors from the fuel tank into the EVAP canister 30. An EVAP vent 33 extending from the canister 30 includes a normally open EVAP solenoid valve 34. A further line 36 extends from the canister 30 to a purge flow sensor 38 to an EVAP purge sensor (typically closed) 40 which is connected to an air induction system and allows the engine intake vacuum to siphon (desorb) precise amounts of fuel vapors previously adsorbed within the EVAP canister for delivery into the engine intake manifold and eventual combustion. The PCM module 28 also receives inputs from each of the EVAP vent solenoid 34, purge flow sensor 38 and EVAP purge solenoid 40.

As will be further described with additional reference to each of succeeding views FIGS. 2-16, the canister 30 contains a graphene adsorbent composition such that, in operation, the adsorbent material adsorbs fuel vapors vented from the fuel tank when the engine is not running and, subsequently, desorbs the fuel vapors back to the engine intake manifold when the engine is running. While a linear canister is depicted in each of FIG. 2 et seq., it is further understood that any configuration of canister, including non-linear, is envisioned within the scope of the invention.

As will be further described the graphene adsorbent may be provided as any of a foam, felt or a powder extruded in the form of pellets, with the Graphene or Graphene derivative further activated using either of a chemical or thermal technique. An organic polymer binder provides improved adhesion of the graphene adsorbent to a surface of the canister. The binder can further be cellulose based. Other features include the graphene adsorbent composition being produced through extrusion and cryodesiccation processes in order to possess high surface area and optimal pore sizes for providing appropriate adsorption and desorption of vaporized hydrocarbons.

Figure 2:
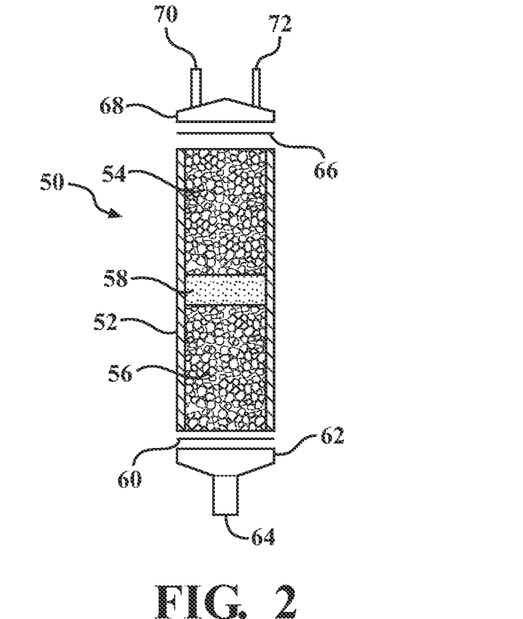
FIG. 2 is an illustration in partially exploded and plan cutaway of an EVAP canister, such as employed in the evaporative emission control system of FIG. 1, and depicting a first non-limiting variant in which Graphene-derivatives are incorporated into a volume compensator of polymeric foam surrounded by additional volumes of an adsorbent material, with a first felt layer being located at a first end of the canister to which is attached load and purge lines, and a second felt layer located at an opposite end of the canister in communication with a fresh air port.

Proceeding to FIG. 2, an illustration is generally shown at 50 in partially exploded and plan cutaway of an EVAP canister, such as employed in the evaporative emission control system of FIG. 1. The EVAP canister includes a main housing 52 (also shown in non-limited fashion having a cylindrical shape with a hollow interior).

The housing 52 encloses a volume of the adsorbent material capable of adsorbing hydrocarbons and again including, without limitation, any of Graphene, few layered Graphene, Graphene oxide, reduced Graphene oxide, and functionalized Graphene. The loading concentration of Graphene-derivatives for foam and felt may vary from 0.1-60 percentage by weight. The adsorbent material is depicted as upper 54 and lower 56 sections, these separated by and surrounding a further volume of a polymeric based foam with Graphene-derivatives 58 incorporated in the polymer and that is used to maintain the canister volume and enable proper adsorption of fuel vapors in the canister.

Without limitation, the group of Graphene-derivatives may again include, but are not limited to, any of a monolayer Graphene, few layered Graphene, Graphene oxide, reduced Graphene oxide, and functionalized Graphene. The loading concentration of Graphene-derivatives may vary from 0.1-50 percentage by weight. The polymer may include any of a thermoplastic polymer and may be chosen from, but not restricted to polyurethane, polyester, polypropylene, nylon 6, nylon 6,6, nylon-12, nylon-6,12, polyethylene, terephthalate, polybutylene, polyphthalamide, polyoxymethylene, polycarbonate, and polyvinylchloride.

A first felt layer 60 is located at one end of the canister main housing 52 and over which is attached a top cover 62 incorporating a fresh air port 64. A second felt layer 66 is located at an opposite end of the canister main 52 and over which is attached a further cover 68 incorporating each of load 70 and purge 72 lines, the felt layers being provided in each embodiment for assisting in packing down the sorbent material within the canister.

The operation of the EVAP canister 50 is similar as that previously described and includes the vapor canister being communicated by the vapor inlet (load) line 70 extending from the fuel tank, again communicating with a vent control valve for allowing the flow of fuel vapors from the fuel tank into the EVAP canister. The EVAP vent (also air port 64) extends from the canister 50 and includes a normally open EVAP solenoid valve (see again at 34 in FIG. 1), with the further line 72 extending from the canister 50 to the purge flow sensor (previously at 38 as described in FIG. 1) to the EVAP purge sensor 40 (typically closed) which is connected to an air induction system and allows the engine intake vacuum to siphon (desorb) precise amounts of fuel vapors previously adsorbed within the EVAP canister for delivery into the engine intake manifold during operation of the engine and eventual combustion.

Figure 3:
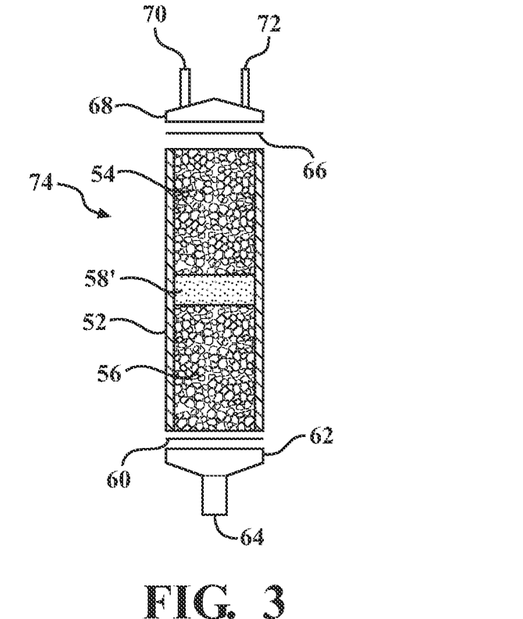
FIG. 3 is an illustration of a canister similar to that shown in FIG. 2, including a combination graphene-derivatives and lignocellulose incorporated into the volume compensator polymeric foam according to a further variant.
Figure 4:
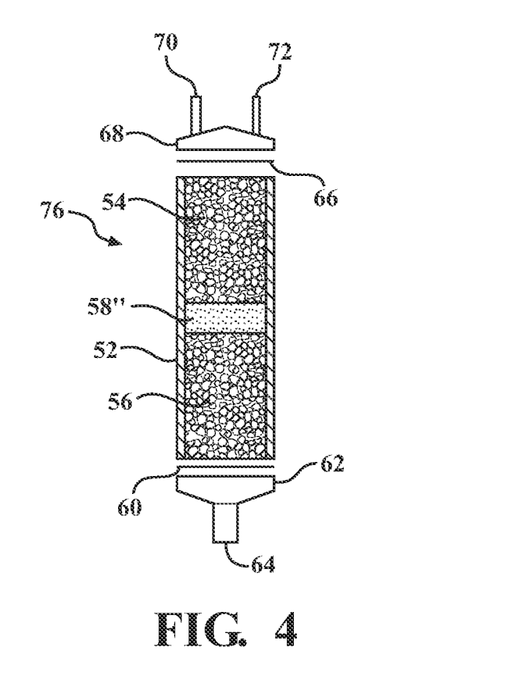
FIG. 4 is an illustration of a canister similar to that shown in FIG. 2, including a combination graphene-derivatives and charcoal incorporated into the volume compensator polymeric foam according to a further variant.

With subsequent reference to FIGS. 3-16 a similar EVAP canister construction is shown such that identical components will be repetitively numbered and description will be limited to any variations in the compositions disclosed in FIG. 2. FIG. 3 is an illustration of a canister, generally at 74, similar to that shown in FIG. 2, with the exception that the polymeric foam composition 58' includes a combination of both the graphene-derivatives and lignocellulose incorporated into the volume compensator foam. FIG. 4 is an illustration of a canister 76 similar to that shown in FIG. 2 and, in relevant part, including a combination graphene-derivatives and charcoal incorporated into a further version of a volume compensator polymeric foam, depicted at 58", according to a further variant.

Figure 5:
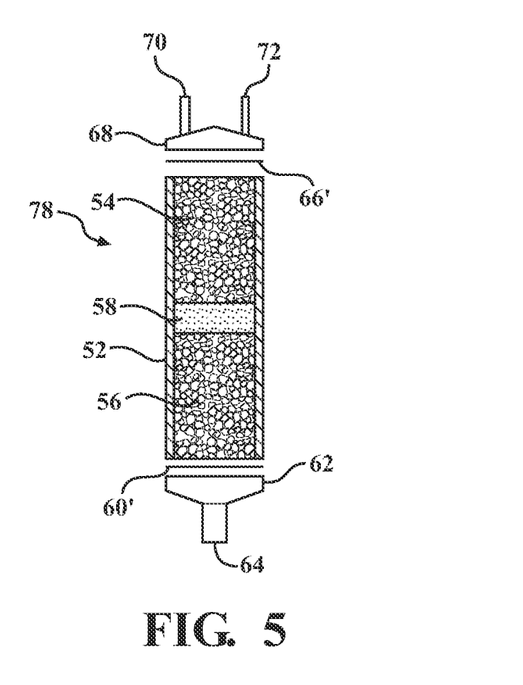
FIG. 5 is an illustration of another variant of a canister similar to that shown in FIG. 2, again including a combination graphene-derivatives incorporated into the volume compensator polymeric foam as well as additional graphene derivatives incorporated into both of the opposite canister end located felt layers.

FIG. 5 is an illustration of another variant 78 of a canister similar to that shown in FIG. 2, again including a combination graphene-derivatives incorporated into the volume compensator polymeric foam (at 58) as well as additional graphene derivatives incorporated into both of the opposite canister end located felt layers, these further depicted at 60' and 66'.

Figure 6:
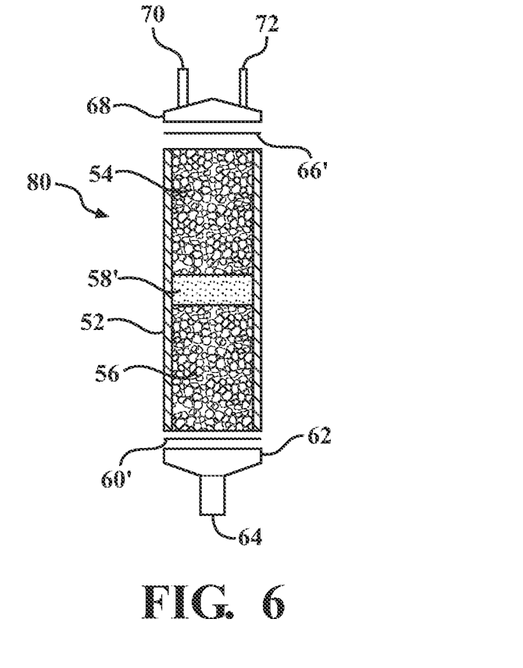
FIG. 6 is an illustration of a further variant of a canister combining aspects of FIGS. 3 and 5 by which the volume compensator polymeric foam incorporates graphene derivatives along with lignocellulose, along with the additional graphene derivatives incorporated into both of the opposite canister end located felt layers.

FIG. 6 is an illustration of a further variant of a canister 80 combining aspects of FIGS. 3 and 5 by which the volume compensator polymeric foam incorporates graphene derivatives along with lignocellulose (again at 58'), along with the additional graphene derivatives incorporated into both of the opposite canister end located felt layers (at 60' and 66').

Figure 7:
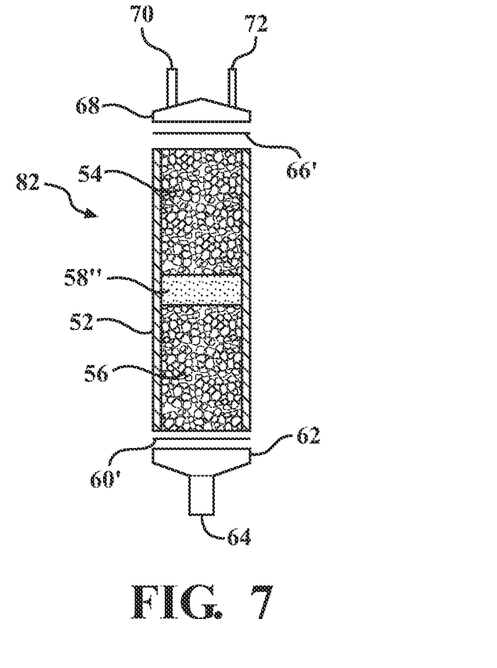
FIG. 7 is an illustration of a further variant of a canister combining aspects of FIGS. 4 and 5 by which the volume compensator polymeric foam incorporates graphene derivatives with charcoal, along with the additional graphene derivatives incorporated into both of the opposite canister end located felt layers.

FIG. 7 is an illustration of a further variant 82 of a canister combining aspects of FIGS. 4 and 5, and by which the volume compensator polymeric foam incorporates graphene derivatives with charcoal (again at 58"), along with the additional graphene derivatives incorporated into both of the opposite canister end located felt layers (60' and 66').

Figure 8:
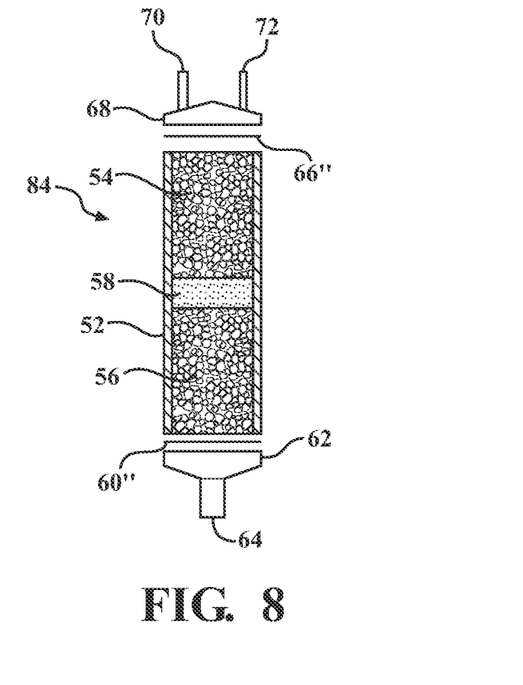
FIG. 8 is an illustration of a further variant of canister combining graphene-derivatives incorporated into the volume compensator polymeric foam surrounded by the adsorbent material as well as additional graphene derivatives and lignocellulose incorporated into both of the opposite canister end located felt layers.

FIG. 8 is an illustration of a further variant of canister 84, again combining graphene-derivatives incorporated into the volume compensator polymeric foam (at 58) surrounded by the adsorbent material (54 and 56), and with additional graphene derivatives and lignocellulose incorporated together into both of the opposite canister end located felt layers (shown at 60" and 66").

Figure 9:
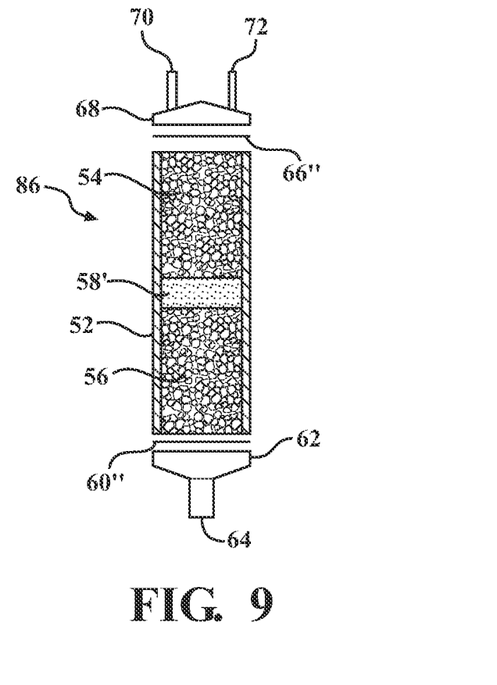
FIG. 9 is an illustration of a further variant of canister combining graphene-derivatives incorporated with lignocellulose into the volume compensator polymeric foam surrounded by the adsorbent material as well as additional graphene derivatives and lignocellulose incorporated into both of the opposite canister end located felt layers.

FIG. 9 is an illustration 86 of a further variant of canister combining graphene-derivatives incorporated with lignocellulose into the volume compensator polymeric foam (again at 58') surrounded by the adsorbent materials (again 54 and 56) as well as additional graphene derivatives and lignocellulose incorporated into both of the opposite canister end located felt layers at 60" and 66".

Figure 10:
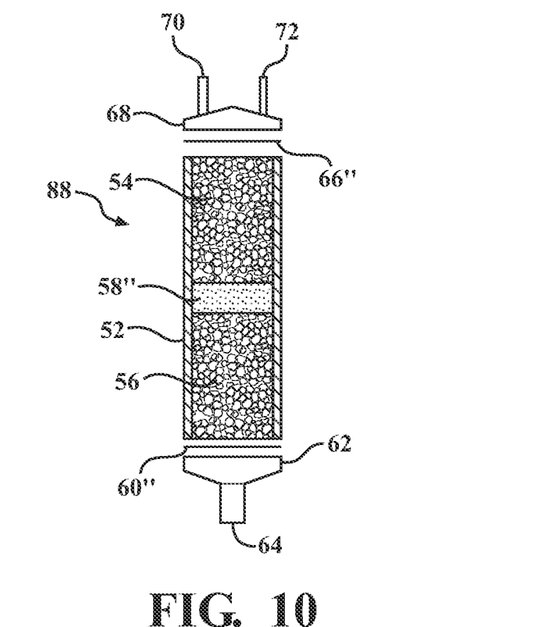
FIG. 10 is an illustration of a further variant of canister combining graphene-derivatives incorporated with charcoal into the volume compensator polymeric foam, surrounded by the adsorbent material, with additional graphene derivatives and lignocellulose incorporated into both of the opposite canister end located felt layers.

FIG. 10 is an illustration of a further variant of canister 88 combining graphene-derivatives incorporated with charcoal into the volume compensator polymeric foam (at 58"), surrounded by the adsorbent material (again surrounding volumes 54/56), with additional graphene derivatives and lignocellulose incorporated into both of the opposite canister end located felt layers, again at 60" and 66".

Figure 11:
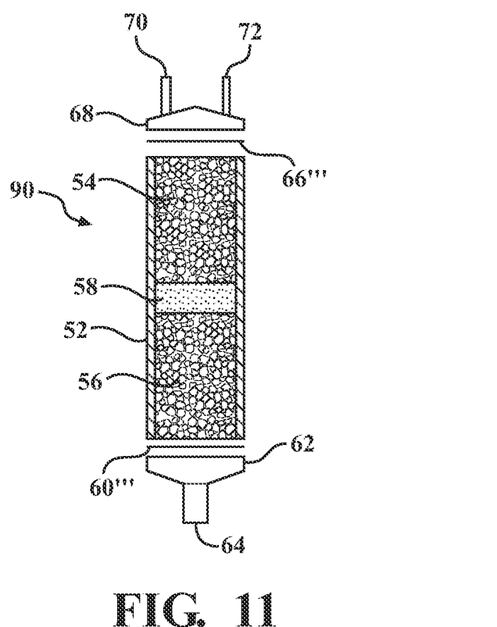
FIG. 11 is an illustration of a further variant of canister combining graphene-derivatives incorporated into the volume compensator polymeric foam surrounded by the adsorbent material with additional graphene derivatives and charcoal incorporated into both of the opposite canister end located felt layers.

FIG. 11 is an illustration of a further variant of canister 90 again combining graphene-derivatives incorporated into the volume compensator polymeric foam 58 surrounded by the adsorbent material (54/56), and with additional graphene derivatives and charcoal incorporated into both of the opposite canister end located felt layers (shown at 60'" and 66'").

Figure 12:
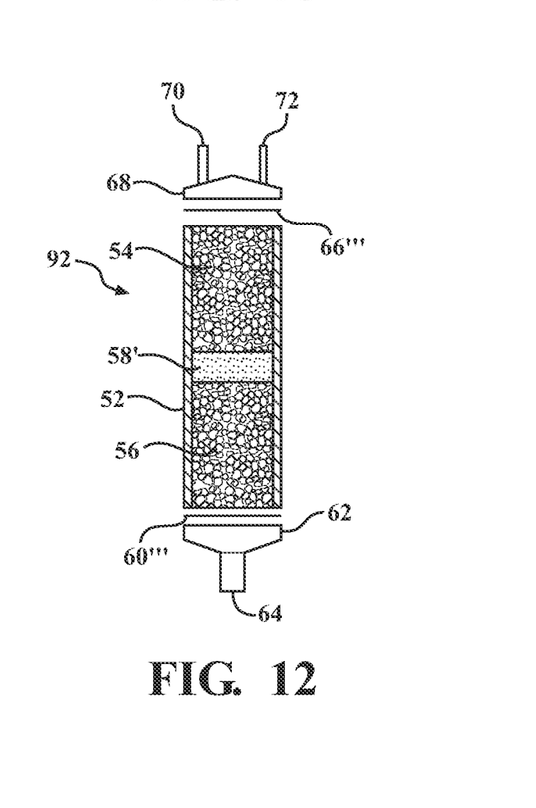
FIG. 12 is an illustration of a further variant of canister combining graphene-derivatives with lignocellulose incorporated into the volume compensator polymeric foam surrounded by the adsorbent material with additional graphene derivatives and charcoal incorporated into both of the opposite canister end located felt layers.

FIG. 12 is an illustration of a further variant of canister 92 combining graphene-derivatives with lignocellulose incorporated into the volume compensator polymeric foam (at 58') surrounded by the adsorbent material with additional graphene derivatives and charcoal incorporated into both of the opposite canister end located felt layers (again at 60'" and 66'").

Figure 13:
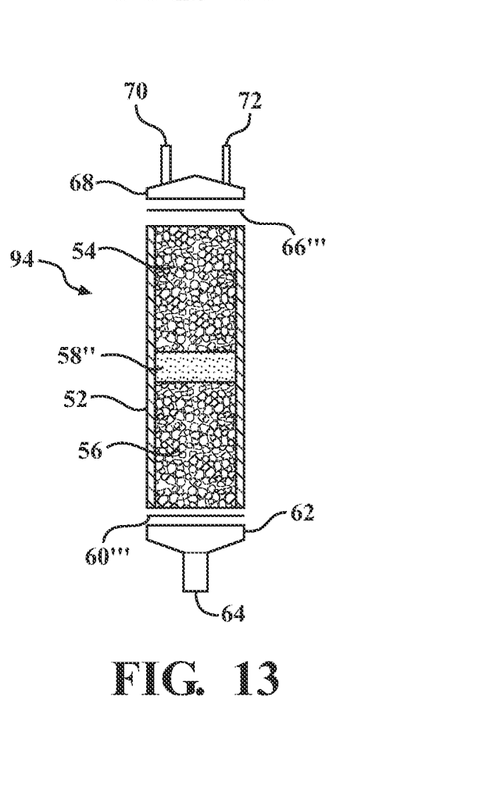
FIG. 13 is an illustration of a further variant of canister combining graphene-derivatives with charcoal incorporated into the volume compensator polymeric foam surrounded by the adsorbent material with additional graphene derivatives and charcoal incorporated into both of the opposite canister end located felt layers.

FIG. 13 is an illustration of a further variant of canister 94 combining graphene-derivatives with charcoal incorporated into the volume compensator polymeric foam (at 58") surrounded by the adsorbent material (54/56), with additional graphene derivatives and charcoal incorporated into both of the opposite canister end located felt layers (again at 60'" and 66'").

Figure 14:
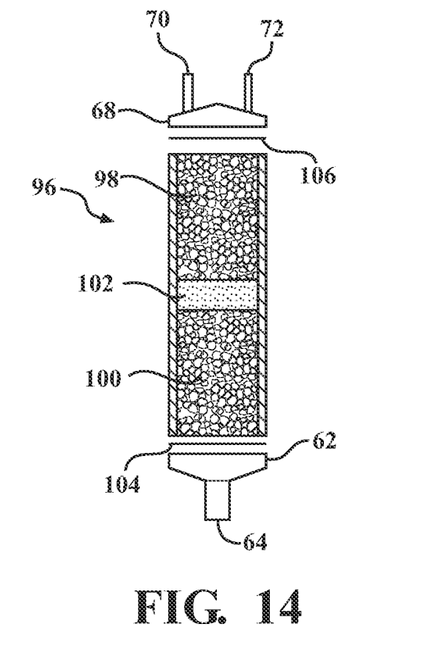
FIG. 14 is an illustration of a yet further variant of canister incorporating graphene derivatives, including such as any of graphene pellets, foam or felt incorporated into the outer adsorbent materials, between which is sandwiched the volume compensator foam interior, in combination with outer felt layers applied at opposite ends thereof.

FIG. 14 is an illustration of a yet further variant of canister 96 incorporating graphene derivatives, including such as pellets, incorporated into the outer adsorbent materials (see at 98 and 100), between which is sandwiched a volume compensator foam interior (at 102), this in combination with outer felt layers (104 and 106) applied at opposite ends thereof and in substitution of the felt layers as previously depicted in FIGS. 2-13.

Figure 15:
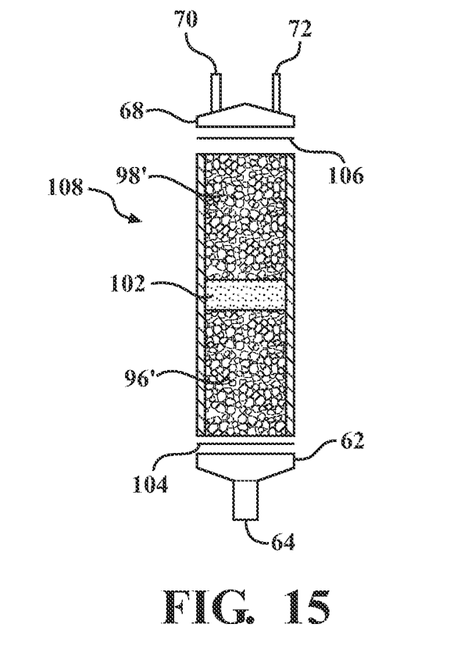
FIG. 15 is an illustration similar to FIG. 14 and further including lignocellulose incorporated along with the graphene derivatives into the outer adsorbent materials surrounding the volume compensator foam interior, and again with outer felt layers at opposite end of the EVAP canister.

FIG. 15 is an illustration, at 108, similar to FIG. 14 and further including lignocellulose incorporated along with the graphene derivatives into the outer adsorbent materials, see at 96' and 98', these surrounding the volume compensator foam interior 102, and again with outer felt layers 104 and 106 at opposite end of the EVAP canister.

Figure 16:
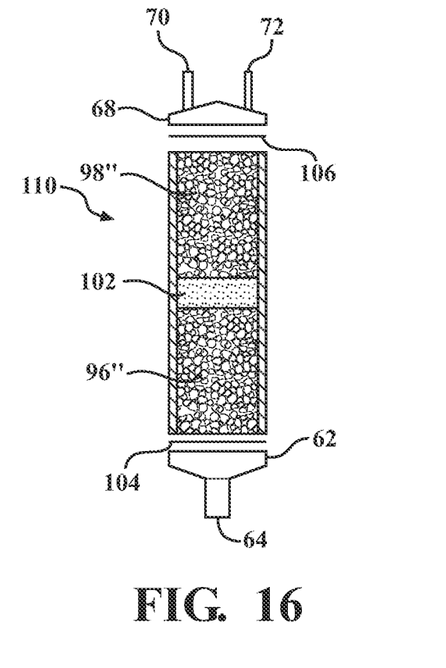
FIG. 16 is an illustration similar to FIG. 15 with the substitution of charcoal for lignocellulose incorporated along with the graphene derivatives into the outer adsorbent materials surrounding the volume compensator foam interior, again in further combination with the outer felt layers of the EVAP canister.

FIG. 16 is an illustration, at 110, similar to FIG. 15 with the substitution of charcoal for lignocellulose incorporated along with the graphene derivatives into the outer adsorbent materials (see as shown at 96" and 98") surrounding the volume compensator foam interior 102, again in further combination with the outer felt layers 104 and 106 of the EVAP canister 110.

Figure 17:
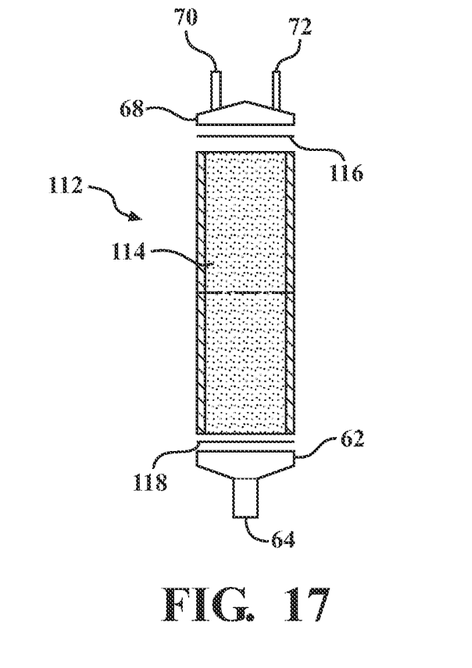
FIG. 17 presents an additional cutaway illustration of a canister similar to that previously described and incorporating a foam or felt sorbent material including any combination of Graphene-derivatives, lignocellulose, and charcoal, with outer felt layers also including any combination of Graphene-derivatives, lignocellulose and charcoal.

FIG. 17 presents an additional cutaway illustration of a canister, generally at 112, similar to that previously described and incorporating any of a foam or felt sorbent material 114, this provided with any combination of Graphene-derivatives, lignocellulose, and charcoal. Also shown are outer felt layers 116 and 118, these also including any combination of Graphene-derivatives, lignocellulose and charcoal.

Having described my invention, other and additional preferred embodiments will become apparent to those skilled in the art to which it pertains, and without deviating from the scope of the appended claims. The detailed description and drawings are further understood to be supportive of the disclosure, the scope of which being defined by the claims. While some of the best modes and other embodiments for carrying out the claimed teachings have been described in detail, various alternative designs and embodiments exist for practicing the disclosure defined in the appended claims.

The foregoing disclosure is further understood as not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, a person of ordinary skill in the art will recognize that changes may be made in form and detail without departing from the scope of the present disclosure. Thus, the present disclosure is limited only by the claims.

In the foregoing specification, the disclosure has been described with reference to specific embodiments. However, as one skilled in the art will appreciate, various embodiments disclosed herein can be modified or otherwise implemented in various other ways without departing from the spirit and scope of the disclosure. Accordingly, this description is to be considered as illustrative and is for the purpose of teaching those skilled in the art the manner of making and using various embodiments of the disclosure. It is to be understood that the forms of disclosure herein shown and described are to be taken as representative embodiments. Equivalent elements, materials, processes or steps may be substituted for those representatively illustrated and described herein. Moreover, certain features of the disclosure may be utilized independently of the use of other features, all as would be apparent to one skilled in the art after having the benefit of this description of the disclosure. Expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural.

Further, various embodiments disclosed herein are to be taken in the illustrative and explanatory sense, and should in no way be construed as limiting of the present disclosure. All joinder references (e.g., attached, affixed, coupled, connected, and the like) are only used to aid the reader's understanding of the present disclosure, and may not create limitations, particularly as to the position, orientation, or use of the systems and/or methods disclosed herein. Therefore, joinder references, if any, are to be construed broadly. Moreover, such joinder references do not necessarily infer that two elements are directly connected to each other.

Additionally, all numerical terms, such as, but not limited to, "first", "second", "third", "primary", "secondary", "main" or any other ordinary and/or numerical terms, should also be taken only as identifiers, to assist the reader's understanding of the various elements, embodiments, variations and/or modifications of the present disclosure, and may not create any limitations, particularly as to the order, or preference, of any element, embodiment, variation and/or modification relative to, or over, another element, embodiment, variation and/or modification.

It will also be appreciated that one or more of the elements depicted in the drawings/figures can also be implemented in a more separated or integrated manner, or even removed or rendered as inoperable in certain cases, as is useful in accordance with a particular application. Additionally, any signal hatches in the drawings/figures should be considered only as exemplary, and not limiting, unless otherwise specifically specified.

The invention claimed is:

1. An evaporative emissions control system for an automobile for reducing evaporative emissions, comprising:
   an evaporative canister coupled to a fuel tank, said canister containing a sorbent material capable of adsorbing hydrocarbons and selected from the group of activated Graphene-derivatives including any of monolayer Graphene, few layered Graphene, Graphene oxide, reduced Graphene oxide, and functionalized Graphene;
   a vapor inlet on said canister connected to said fuel tank;
   a purge outlet on said canister connected to an air induction system; and
   wherein the sorbent material adsorbs fuel vapors when the engine is not running and desorbs fuel vapors when the engine is running.

2. The system of claim 1, further comprising said Graphene derivatives provided as any of a powder extruded, stamped or molded pellets and activated using either of a chemical or thermal technique.

3. The system of claim 1, further comprising said sorbent material provided as a combination of a powder extruded, stamped or molded pellets and polymeric foam or felt layers expanding into said canister in order to pack down said sorbent material to maintain an internal volume of said canister and enable proper absorption of said hydrocarbons.

4. The system of claim 2, further comprising an organic polymer binder for preserving a shape of said pellets.

5. The system of claim 4, further comprising said organic polymer binder being cellulose based.

6. The system as described in claim 1, further comprising said sorbent material being produced through extrusion and cryodesiccation processes in order to maintain high surface area and optimal pore sizes, appropriate for adsorption and desorption of vaporized hydrocarbons.

7. The system as described in claim 1, said sorbent material further comprising any of a lignocellulose or charcoal material combined with said activated Graphene-derivatives.

8. The system as described in claim 3, further comprising a concentration of said Graphene-derivatives for said foam or felt layers being provided in a range of 0.1-60 percentage by weight.

9. The system as described in claim 3, said further comprising said polymeric foam being chosen from any one of polyurethane, polyester, polypropylene, nylon 6, nylon 6,6, nylon-12, nylon-6,12, polyethylene, terephthalate, polybutylene, polyphthalamide, polyoxymethylene, polycarbonate, and polyvinylchloride.

10. The system as described in claim 3, said polymer further comprising a thermoplastic polymer chosen from any one of polyurethane, polyester, polypropylene, nylon 6, nylon 6,6, nylon-12, nylon-6,12, polyethylene, terephthalate, polybutylene, polyphthalamide, polyoxymethylene, polycarbonate, and polyvinylchloride.

11. The system as described in claim 1, said sorbent material further comprising a foam or felt incorporated with any combination of Graphene-derivatives, lignocellulose, and charcoal.

12. An evaporative emissions control system for an automobile for reducing evaporative emissions, comprising:
   an evaporative canister coupled to a fuel tank, said canister containing a sorbent material provided as any of a powder extruded, stamped or molded pellets and capable of adsorbing hydrocarbons, said sorbent material selected from the group of activated Graphene-derivatives including any of monolayer Graphene, few layered Graphene, Graphene oxide, reduced Graphene oxide, and functionalized Graphene;
   a cellulose based organic polymer binder for preserving a shape of said sorbent pellets material;
   a vapor inlet on said canister connected to said fuel tank;
   a purge outlet on said canister connected to an air induction system; and
   wherein the sorbent material adsorbs fuel vapors when the engine is not running and desorbs fuel vapors when the engine is running.

13. The system of claim 12, further comprising said sorbent material provided as a polymeric foam, any of foam or felt outer layers expanding into said canister to pack down said polymeric foam to maintain an internal volume of said canister and enable adsorption of said hydrocarbons.

14. The system as described in claim 12, further comprising said sorbent material being produced through extrusion and cryodesiccation processes in order to maintain high surface area and optimal pore sizes, appropriate for adsorption and desorption of vaporized hydrocarbons.

15. The system as described in claim 12, said sorbent material further comprising any of a lignocellulose or charcoal material combined with said activated Graphene-derivatives.

16. The system as described in claim 13, further comprising a concentration of said Graphene-derivatives for said foam or felt layers being provided in a range of 0.1-60 percentage by weight.

17. The system as described in claim 13, said further comprising said polymeric foam being chosen from any one of polyurethane, polyester, polypropylene, nylon 6, nylon 6,6, nylon-12, nylon-6,12, polyethylene, terephthalate, polybutylene, polyphthalamide, polyoxymethylene, polycarbonate, and polyvinylchloride.

18. The system as described in claim 13, said polymer further comprising a thermoplastic polymer chosen from any one of polyurethane, polyester, polypropylene, nylon 6, nylon 6,6, nylon-12, nylon-6,12, polyethylene, terephthalate, polybutylene, polyphthalamide, polyoxymethylene, polycarbonate, and polyvinylchloride.

19. The system as described in claim 12, said sorbent material further comprising a foam or felt incorporated with any combination of Graphene-derivatives, lignocellulose, and charcoal.

20. An evaporative emissions control system for an automobile for reducing evaporative emissions, comprising:
an evaporative canister coupled to a fuel tank, said canister containing a sorbent material capable of adsorbing hydrocarbons and selected from the group of activated Graphene-derivatives including any one of monolayer Graphene, few layered Graphene, Graphene oxide, reduced Graphene oxide, and functionalized Graphene;
said sorbent material provided as a polymeric foam, any one of foam or felt outer layers expanding into said canister to pack down said polymeric foam to maintain an internal volume of said canister and enable adsorption of said hydrocarbons;
said polymeric foam being chosen from any one of polyurethane, polyester, polypropylene, nylon 6, nylon 6,6, nylon-12, nylon-6,12, polyethylene, terephthalate, polybutylene, polyphthalamide, polyoxymethylene, polycarbonate, and polyvinylchloride;
a vapor inlet on said canister connected to said fuel tank;
a purge outlet on said canister connected to an air induction system; and
wherein the sorbent material adsorbs fuel vapors when the engine is not running and desorbs fuel vapors when the engine is running.

* * * * *